United States Patent
Koenck et al.

(10) Patent No.: US 6,910,632 B2
(45) Date of Patent: *Jun. 28, 2005

(54) DATA PROCESSING AND COMMUNICATIONS DEVICE WITH INTERCHANGEABLE MODULES

(75) Inventors: Steven E. Koenck, Cedar Rapids, IA (US); Phillip Miller, Cedar Rapids, IA (US); George E. Hanson, Cedar Rapids, IA (US); Darald R. Schultz, Cedar Rapids, IA (US); Jeffrey S. Krunnfusz, Cedar Rapids, IA (US)

(73) Assignee: Broadcom Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/188,183

(22) Filed: Jul. 2, 2002

(65) Prior Publication Data

US 2002/0162892 A1 Nov. 7, 2002

Related U.S. Application Data (63) Continuation of application No. 09/609,078, filed on Jun. 30, 2000, now Pat. No. 6,431,451, which is a continuation of application No. 08/735,174, filed on Oct. 22, 1996, now abandoned, which is a continuation of application No. 08/277,559, filed on Jul. 19, 1994, now Pat. No. 5,567,925, which is a continuation of application No. 08/071,555, filed on Jun. 4, 1993, now Pat. No. 5,331,136, which is a continuation of application No. 07/660,615, filed on Feb. 25, 1991, now Pat. No. 5,218,187.

(51) Int. Cl.[7] .................................................. G06K 7/10
(52) U.S. Cl. .............................. 235/472.01; 235/462.45
(58) Field of Search ...................... 235/472.01, 472.02, 235/472.03, 462.45, 462.46, 462.47, 462.48, 462.49

(56) References Cited

U.S. PATENT DOCUMENTS

| | | | |
|---|---|---|---|
| 3,665,164 A | 5/1972 | Beveridge | 235/460 |
| D229,234 S | 11/1973 | Kajita | D14/100 |

(Continued)

FOREIGN PATENT DOCUMENTS

| | | |
|---|---|---|
| EP | 0194115 | 9/1986 |
| EP | 0262943 | 4/1988 |
| FR | 2389938 | 1/1979 |
| GB | 1572962 | 8/1980 |
| GB | 2201125 | 8/1988 |
| JP | 58-176792 | 10/1983 |
| JP | 58-211261 | 12/1983 |
| JP | 2-144681 | 6/1990 |
| WO | 8700659 | 1/1987 |
| WO | 8707106 | 11/1987 |

OTHER PUBLICATIONS

"PCMCIA Primer" by John Reimer, pp. 66–67, date unknown.

(Continued)

Primary Examiner—Karl D. Frech
(74) Attorney, Agent, or Firm—McAndrews, Held & Malloy, Ltd.

(57) ABSTRACT

A data communications device includes a base unit having a first microprocessor and a data and communication module received by the base unit that includes a second microprocessor and a transceiver. The data and communication module is selected from a plurality of data and communication modules each having different types of transceivers. A program is stored in one of the base unit and the data and communication module to control communication of control signals and data between the first microprocessor and the second microprocessor according to a uniform data protocol that is understandable to the base unit.

24 Claims, 5 Drawing Sheets

U.S. PATENT DOCUMENTS

| | | |
|---|---|---|
| D230,859 S | 3/1974 | Kurosu .................. D26/56 |
| 3,826,900 A | 7/1974 | Moellering ............. 250/568 |
| 3,947,817 A | 3/1976 | Requa .................... 235/472 |
| 3,976,973 A | 8/1976 | Martin et al. ........... 235/472 |
| 4,002,892 A | 1/1977 | Zielinski ................. 307/150 |
| 4,005,400 A | 1/1977 | Engdahl ............... 340/365 R |
| 4,017,725 A | 4/1977 | Roen ...................... 235/152 |
| 4,020,527 A | 5/1977 | O'Neill ..................... 16/110 |
| 4,058,838 A | 11/1977 | Crager et al. ........... 358/257 |
| 4,091,270 A | 5/1978 | Musch et al. ........... 235/419 |
| 4,115,870 A | 9/1978 | Lowell .................... 364/900 |
| 4,133,034 A | 1/1979 | Etter ....................... 364/464 |
| 4,136,821 A | 1/1979 | Sugiura et al. .......... 235/462 |
| 4,141,492 A | 2/1979 | Michel et al. ........... 235/437 |
| 4,158,130 A | 6/1979 | Speraw et al. .......... 235/146 |
| 4,158,194 A | 6/1979 | McWaters et al. ...... 235/454 |
| 4,165,554 A | 8/1979 | Faget ........................ D18/7 |
| 4,188,103 A | 2/1980 | Biber et al. ............... 354/27 |
| 4,210,802 A | 7/1980 | Sakai ....................... 235/483 |
| 4,247,908 A | 1/1981 | Lockhart, Jr. et al. ... 364/900 |
| 4,277,837 A | 7/1981 | Stuckert .................. 364/900 |
| 4,282,425 A | 8/1981 | Chadima et al. ........ 235/462 |
| 4,322,613 A | 3/1982 | Lange ..................... 235/419 |
| 4,385,285 A | 5/1983 | Horst et al. ................. 382/3 |
| 4,414,661 A | 11/1983 | Karlstrom .................. 370/95 |
| 4,415,065 A | 11/1983 | Sandstedt .................. 186/39 |
| 4,418,277 A | 11/1983 | Tremmel et al. ........ 235/472 |
| 4,422,745 A | 12/1983 | Hopson ................... 354/105 |
| 4,423,319 A | 12/1983 | Jacobsen ................. 235/419 |
| 4,460,120 A | 7/1984 | Shepard et al. ......... 235/472 |
| 4,488,679 A | 12/1984 | Bockholt et al. ........ 235/469 |
| 4,500,776 A | 2/1985 | Laser ...................... 235/162 |
| 4,506,344 A | 3/1985 | Hubbard ................. 364/900 |
| 4,511,970 A | 4/1985 | Okano et al. ............ 364/401 |
| 4,519,068 A | 5/1985 | Krebs et al. | 
| 4,523,087 A | 6/1985 | Benton .................... 235/379 |
| 4,523,297 A | 6/1985 | Ugon et al. .............. 235/380 |
| 4,569,421 A | 2/1986 | Sandstedt ................ 235/383 |
| 4,570,057 A | 2/1986 | Chadima, Jr. et al. ... 364/708 |
| 4,578,571 A | 3/1986 | Williams ................. 235/472 |
| 4,603,262 A | 7/1986 | Eastman et al. ......... 250/566 |
| 4,621,189 A | 11/1986 | Kumar et al. ............ 235/472 |
| 4,627,736 A | 12/1986 | Komaki ..................... 368/88 |
| 4,628,193 A | 12/1986 | Blum ....................... 235/375 |
| 4,634,845 A | 1/1987 | Hale et al. ............... 235/350 |
| 4,641,292 A | 2/1987 | Tunnell et al. ............. 381/42 |
| 4,654,818 A | 3/1987 | Wetterau, Jr. ........... 364/900 |
| 4,661,993 A | 4/1987 | Leland et al. ............ 455/103 |
| 4,689,761 A | 8/1987 | Yurchenco ............... 364/708 |
| 4,703,161 A | 10/1987 | McLean ...................... 235/1 |
| 4,706,096 A | 11/1987 | Sato ........................ 235/488 |
| 4,718,103 A | 1/1988 | Shajima et al. ............ 382/13 |
| 4,718,110 A | 1/1988 | Schaefer ................... 455/90 |
| 4,727,245 A | 2/1988 | Dobbins et al. ......... 235/472 |
| 4,734,566 A | 3/1988 | Senda et al. ............. 235/495 |
| D295,411 S | 4/1988 | Cho et al. .............. D14/100 |
| 4,743,773 A | 5/1988 | Katanta et al. ........... 250/566 |
| 4,749,353 A | 6/1988 | Breedlove ................. 381/43 |
| 4,752,965 A | 6/1988 | Dunkley .................. 235/379 |
| 4,758,717 A | 7/1988 | Shepard et al. ......... 235/472 |
| 4,760,248 A | 7/1988 | Swartz et al. ............ 235/472 |
| 4,761,822 A | 8/1988 | Maile ........................ 455/82 |
| 4,766,300 A | 8/1988 | Chadima, Jr. et al. ... 235/472 |
| 4,768,230 A | 8/1988 | Viebrantz et al. ........ 455/603 |
| 4,773,032 A | 9/1988 | Uehara .................... 364/900 |
| 4,793,812 A | 12/1988 | Sussman et al. ......... 235/472 |
| 4,825,057 A | 4/1989 | Swartz .................... 235/472 |
| 4,831,275 A | 5/1989 | Drucker .................. 235/472 |
| 4,835,372 A | 5/1989 | Gombrich ................ 235/375 |
| 4,836,256 A | 6/1989 | Meliconi ................. 206/523 |
| 4,837,858 A | 6/1989 | Ablay et al. ............... 455/34 |
| 4,842,966 A | 6/1989 | Omori et al. ............. 307/150 |
| 4,845,350 A | 7/1989 | Shepard et al. ......... 235/472 |
| 4,850,009 A | 7/1989 | Zook et al. .............. 235/375 |
| D303,112 S | 8/1989 | Desrochers .............. D14/100 |
| 4,857,716 A | 8/1989 | Gombrich et al. ....... 235/462 |
| 4,866,646 A | 9/1989 | Nakamura et al. ... 364/709.11 |
| 4,877,949 A | 10/1989 | Danielson et al. ....... 235/462 |
| 4,881,839 A | 11/1989 | Grimm .................... 400/692 |
| 4,890,832 A | 1/1990 | Komaki ................... 235/146 |
| 4,897,532 A | 1/1990 | Swartz et al. ............ 235/472 |
| 4,910,775 A | 3/1990 | Yves et al. ............... 235/379 |
| 4,916,441 A | 4/1990 | Gombrich ............. 235/380 X |
| 4,940,974 A | 7/1990 | Sojka ................... 340/825.08 |
| 4,942,356 A | 7/1990 | Ellingen et al. .......... 361/392 |
| 4,953,113 A | 8/1990 | Chadima, Jr. et al. .... 364/708 |
| 4,967,188 A | 10/1990 | Collins ..................... 340/636 |
| 4,972,496 A | 11/1990 | Sklarew ...................... 382/13 |
| 4,983,818 A | 1/1991 | Knowles .................. 235/467 |
| 4,984,247 A | 1/1991 | Kaufmann et al. |
| 5,002,184 A | 3/1991 | Lloyd ...................... 206/305 |
| 5,008,879 A | 4/1991 | Fischer et al. ........... 370/85.2 |
| 5,012,407 A | 4/1991 | Finn ........................ 364/200 |
| 5,023,824 A | 6/1991 | Chadima, Jr. et al. ... 235/462 |
| 5,029,181 A | 7/1991 | Endo et al. |
| 5,046,066 A | 9/1991 | Messenger |
| 5,046,130 A | 9/1991 | Hall et al. ................ 455/456 |
| 5,049,862 A | 9/1991 | Dao et al. ................ 340/706 |
| 5,049,863 A | 9/1991 | Oka ......................... 340/710 |
| 5,057,676 A | 10/1991 | Komaki ................... 235/375 |
| 5,059,778 A | 10/1991 | Zouzoulas et al. ....... 235/472 |
| 5,070,536 A | 12/1991 | Mahany et al. ............ 455/67 |
| 5,097,484 A | 3/1992 | Akaiwa |
| 5,101,406 A | 3/1992 | Messenger et al. |
| 5,117,501 A | 5/1992 | Chidress et al. ......... 455/11.1 |
| 5,142,534 A | 8/1992 | Simpson et al. |
| 5,164,942 A | 11/1992 | Kamerman et al. |
| 5,181,200 A | 1/1993 | Harrison |
| 5,202,817 A | 4/1993 | Koenck et al. ........... 361/393 |
| 5,216,233 A | 6/1993 | Main et al. .............. 235/472 |
| 5,218,187 A * | 6/1993 | Koenck et al. ........... 235/375 |
| 5,227,614 A | 7/1993 | Danielson et al. ....... 235/380 |
| 5,268,933 A | 12/1993 | Averbuch |
| 5,291,516 A | 3/1994 | Dixon et al. |
| 5,297,144 A | 3/1994 | Gilbert et al. |
| 5,321,542 A | 6/1994 | Freitas et al. |
| 5,331,136 A * | 7/1994 | Koenck et al. ........... 235/375 |
| 5,363,401 A | 11/1994 | Lucas et al. .............. 375/131 |
| 5,363,402 A | 11/1994 | Harmon et al. |
| 5,390,166 A | 2/1995 | Rohani et al. |
| 5,404,375 A | 4/1995 | Kroeger et al. |
| 5,410,141 A | 4/1995 | Koenck et al. ........... 235/472 |
| 5,410,740 A | 4/1995 | Hagstrom |
| 5,410,752 A | 4/1995 | Scholefield |
| 5,465,392 A | 11/1995 | Baptist et al. |
| 5,469,468 A | 11/1995 | Schilling ................. 375/130 |
| 5,513,184 A | 4/1996 | Vannucci ................. 370/350 |
| 5,546,397 A | 8/1996 | Mahany |
| 5,551,060 A | 8/1996 | Fujii et al. .............. 455/33.4 |
| 5,561,845 A | 10/1996 | Bendixen et al. ....... 455/33.4 |
| 5,567,925 A * | 10/1996 | Koenck et al. ........... 235/375 |
| 5,644,576 A | 7/1997 | Bauchot et al. .......... 375/131 |
| 5,655,219 A | 8/1997 | Jusa et al. ................ 455/338 |
| 5,680,633 A | 10/1997 | Koenck et al. |
| 5,734,645 A | 3/1998 | Raith et al. .............. 455/466 |
| 5,748,621 A | 5/1998 | Masuda et al. .......... 370/337 |
| 5,768,267 A | 6/1998 | Raith et al. .............. 370/329 |
| 5,790,587 A | 8/1998 | Smith et al. ............. 375/147 |
| 5,844,893 A | 12/1998 | Gollnick et al. ......... 370/329 |
| 5,960,344 A | 9/1999 | Mahany ................... 455/432 |
| 6,118,824 A | 9/2000 | Smith et al. ............. 375/259 |

| | | | |
|---|---|---|---|
| 6,138,010 A | 10/2000 | Rabe et al. | 455/426 |
| 6,431,451 B1 * | 8/2002 | Koenck et al. | 235/472.01 |

OTHER PUBLICATIONS

PCMCIA (IC) Cards, vol. 13, No. 8.

News Release "Norand Introduces Enhanced Wireless LAN Capabilities", May 16, 1995, by Norand Corporation, Cedar Rapids, Iowa, pp. 1–4.

News Release "Ositech Communications Inc. Will Release Next Month the Jack of Diamonds, A Type II PC Card", dated May 31, 1995.

Roger C. Alford, "The PCMCIA Redefines Portability", Under The Hood, date unknown.

Gary Legg, "Special Components Simplified Interface to PCMCIA cards", Jun. 10, 1993 EN., pp. 61, 63–64, 66 and 68.

Carole Patton, "Radio Transceiver Circuit Card Acts as Wireless Modem in PCs", Info World, Mar. 28, 1988, p. 18.

John R. Gyoski, "New Deal For Smart Cards", Machine Design, Jun. 1, 1993, pp. 38–40, 42 and 44.

* cited by examiner

DATA PROCESSING AND COMMUNICATIONS DEVICE WITH INTERCHANGEABLE MODULES

CROSS REFERENCE TO RELATED APPLICATIONS (Claiming Benefit Under 35 U.S.C. 120)

This application is a continuation of U.S. application Ser. No. 09/609,078 filed Jun. 30, 2000 now U.S. Pat. No. 6,431,951, which in turn is a continuation of U.S. application Ser. No. 08/735,174 filed Oct. 22, 1996 now abandoned, which in turn is a continuation of U.S. application Ser. No. 08/277,559 filed Jul. 19, 1994 (now U.S. Pat. No. 5,567,925), which in turn is a continuation of U.S. application Ser. No. 08/071,555 filed Jun. 4, 1993 (now U.S. Pat. No. 5,331,136), which in turn is a continuation of U.S. application Ser. No. 07/660,615 filed Feb. 25, 1991 (now U.S. Pat. No. 5,218,187).

INCORPORATION BY REFERENCE

The descriptive matter of U.S. application Ser. No. 07/476,096 filed Jan. 18, 1990, now U.S. Pat. No. 5,052,020 is hereby incorporated by reference in its entirety and made part of this application.

BACKGROUND OF THE INVENTION

This invention relates generally to data systems, and more particularly to data collection and processing systems using portable, hand-held data terminals for collecting, selectively processing and for communicating collected data to other system elements. Typical collection processes may include reading data and manually keying in such read data. Typical automated processes may include scanning indicia of information with a scanner, for example a bar code reader. Data collected-by such terminals may become part of the data base of the system. Real time use of data collected by the data terminals may be implemented by communication interfaces within such data terminals.

Though host computers which as central processing stations of such data systems may control data bases and data flow, the hand-held data terminals are key elements for operating the data systems efficiently. Current data systems using hand-held data terminals have shown a correlation between the functionality of the hand-held data terminals and the overall effectiveness of the systems. While progress has already been made in improving efficiency and functionality of hand-held data terminals, there is nevertheless a need to provide hand-held data terminals which are readily adaptable to perform various functions and communicate with a variety of communications equipment.

SUMMARY OF THE INVENTION

According to this invention, one of a plurality of special purpose data and communications modules is selectively combined with a base module or unit of the hand-held data terminal.

According to one particular aspect of the invention, a base unit includes a user interface in an upward directed surface which would typically be facing toward a person using the data terminal. The user interface typically features a keyboard adjacent a bottom end, and a liquid crystal display adjacent a top end of a substantially rectangular, elongate housing at the data terminal. The base unit provides for a data and communications module to be attached beneath the user interface and adjacent the top end of the housing.

According to another particular aspect of the invention, the data and communications module attachable to the base module includes a communications means of one type, such as a radio using spread spectrum modulation transmissions, the data and communications module including provisions emulating data communications of a second type, the second type of communications and the respective protocol being compatible with data circuits of the base module.

In another particular aspect of the invention, the data and communications module to be attached to the base module includes provisions for data communications and a data scanner provision for collecting data. In a more particular implementation of the invention, the base module includes data collection provisions, collected data being transferable via a cable mounted to the base unit. In combination with the data scanner module, the data and communications module includes provisions for selectively switching data collection operations between the data scanner provision of the data and communications module and the data collection provisions of the base module.

In yet another aspect of the invention the data and communications module may include a modem and typical telephone communications coupling either in lieu of a radio communications provision or in addition thereto. The modem may be provided in the data and communications module with a data scanning device or with alternate data identification and collection provisions.

In one particular implementation including certain features of the invention, the data and communications module is contemplated to include the combination of a radio frequency communications provision and a data identification and collection provision, and an antenna of radio frequency communications provision of the data and communications module may be pivotally mounted to be pivoted to a position out of interfering relationship with the data identification and collection provision, while optimally receiving radio frequency communication.

In furtherance of efficient adaptability of data communications modules to base modules of the data terminals in accordance with the invention, it is contemplated to provide an elastic hand strap on the downward facing surface of a data terminal for retaining manual engagement with the data terminal, the hand strap being attached at one end thereof to a base module of the data terminal. A second, opposite end of the elastic strap is slidably inserted into engagement with a guide track disposed in an outer surface of the data and communications module. The direction of insertion is in the direction of the one end of the elastic hand strap, such that an elastic tension in the hand strap retains the slidable engagement of the other elastic hand strap with the data and communications module of the data terminal. In accordance with the invention, the elastic strap is readily removed without tools by sliding the second end along the guide track in a direction against the tension of the elastic strap.

In a further embodiment according to the invention, in which a base unit includes a data and control interface for interacting with a data and communications module, an improvement in each of a plurality of data and communications modules includes a data and control interface provision including data and control signal conversion provisions for communicating data between the data and communication module and the base module in accordance with a data protocol resident within the base unit.

Various other features and advantages of the data terminal in accordance with the invention will become apparent from the following detailed description, which may be best understood when read with reference to the appended drawings.

DETAILED DESCRIPTION OF THE INVENTION

Figure 1:
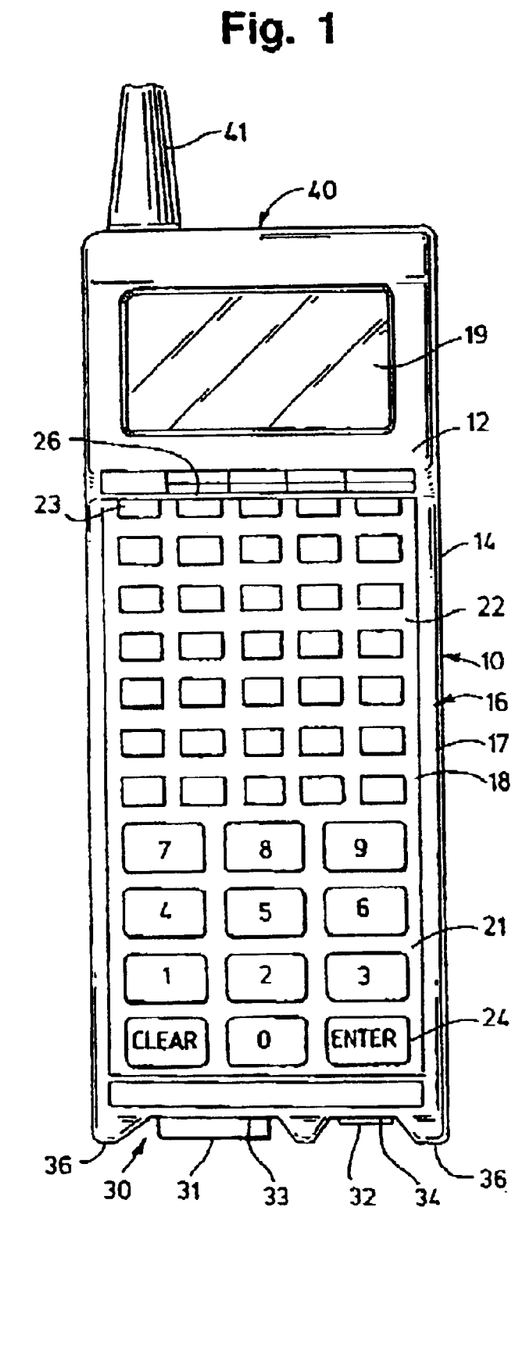
FIG. 1 shows a frontal view of a modular data terminal and showing a frontal or upward directed face of the data terminal, as it would typically face an operator of the data terminal.
Figure 2:
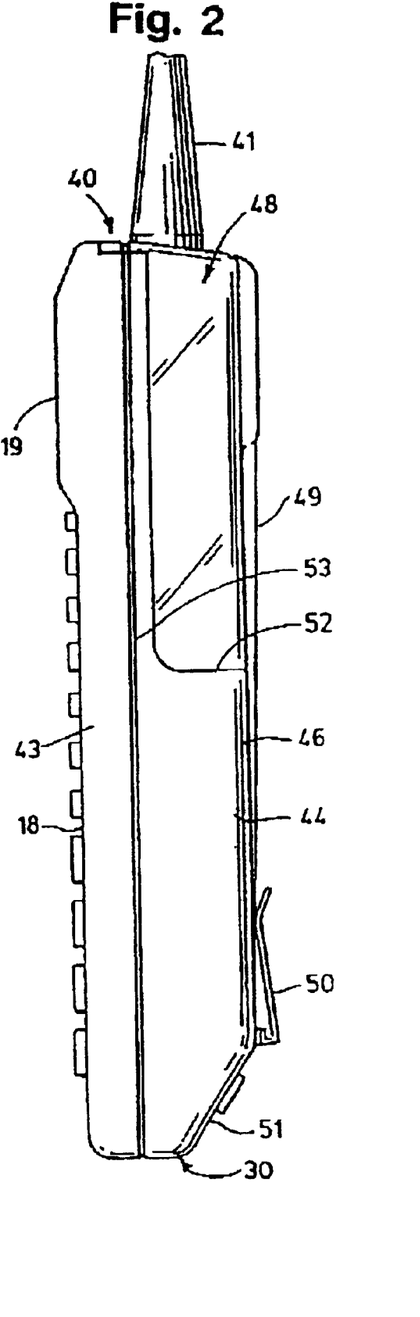
FIG. 2 is a side view of the data terminal shown in FIG. 1.

Referring now to FIGS. 1 and 2, a data collection terminal unit, also referred to herein as data terminal, is designated generally by the numeral 10. As shown in FIG. 1, a frontal face 12 of an elongate housing 14 of a base module 16 of the data terminal 10 typical faces upward and is accessible to the user of the data terminal. The upward facing portion of the module 16 houses a keyboard module 17, including an alphanumerical keyboard 18 and a display screen 19. The display screen 19 is in a preferred embodiment described herein a 4-line by 16-character Reflective Super Twist Liquid Crystal Display (LCD). Of course, other display means may be used in its stead. The keyboard 18 includes a lower, standard numerical keyboard section 21, above which is disposed an alphabetical keyboard arrangement 22. An on-off power key 23 is preferably placed in a leftmost position of an uppermost row on an uppermost row of five keys. The outermost keys 24 in a bottom row are configured as "CLEAR" and "ENTER", while the remaining four keys in the uppermost row are preferably configured as a set of four user-defined function keys 26.

At a bottom end 30 of the housing 14, there are located two connector plugs 31 and 32 in recesses 33 and 34, respectively. Inasmuch as the connectors 31 and 32 are disposed in the recesses, adjacent end and interleaved protrusions 36 of the housing 14 extend somewhat past the connectors to protect the connectors from damage should the data terminal accidentally be dropped or set down on the bottom end 30. A preferred embodiment of the data terminal 10 is intended to withstand without damage a drop of about 1.2 meters to a solid surface, such as concrete. The preferred connector 31 is an input-output port, as may be used for such data collection as bar code reading, for example. In such instance, the connector 31 is preferred to be a 9-pin D-subminiature connector with pins interfacing to typical 5 volt scanning peripherals. The connector 32 may be used for accessing external power sources or provide of combined power and data communication. A circular miniature DIN-type connector 32 may be used in the preferred embodiment. A top end 40 of the preferred embodiment of the base module 16 typically may not include connectors. An antenna 41 shown to extend above the top end 40 is further described in reference to FIG. 2.

FIG. 2 is a side view of a data terminal 10 of FIG. 1. The base module 16 of the data terminal 10 includes an elongate upper housing portion 43 and a battery compartment 44 attached to the upper housing portion 43 adjacent to the bottom end 30. In the preferred embodiment, the battery compartment 44 is assembled as a lower housing portion to the upper housing portion 43 and is equipped with a battery compartment door 46 which may be locked to seal an opening of the battery compartment 44. Adjacent the top end 40 of the data terminal 10 a data and communications module 48 is attached to the lower edge of the upper housing portion 43. The antenna 41 extends upward from the data and communications module 48 above the top end 40 of the data terminal 10. An elastic hand strap 49 is attached to the underside of the data terminal 10. A belt clip 50 may conveniently be mounted to the hand strap 49, allowing the data terminal to be carried on a user's belt. The elastic hand strap is attached adjacent the top end of the data terminal to the underside of the data and communications module 48 and adjacent the bottom end 30 to a sloped lower surface 51 of the battery compartment 44.

One of the features of hand-held data terminals as disclosed herein relates to the exchangeability of modules of different shape and varied function. The data and communications module 48 in FIG. 2 may for example include a radio module which is externally identified by the antenna 41. The radio module may be a commercially available pretuned 1-watt (UHF) frequency modulated (FM) radio transceiver module, or any similar radio module, such as a Motorola P10™ radio model, for example.

In accordance herewith it is contemplated to provide the data and communications module 48 as a module which is readily replaceable with another data and communications module. Each such module will feature a quick exchange mounting mechanism, such as is more clearly illustrated with respect to FIG. 3, and any of a number of features packaged in one of a number of compatible data and communications modules. When mounted, the module, such as the data and communications module 48 is matched in a contour continuation along a juncture 52 to the adjacent edge of the battery compartment 44 and along a longitudinal parting line 53 of the base module 16. For example, the data and communications module 48 is sized to include the described radio frequency transceiver module, as indicated by the antenna 41. Other data and communications modules may include a similar radio frequency transceiver module and may include additional memory capacity to function with the base module 16. Various combinations of features are contemplated in accordance herewith.

Figure 3:
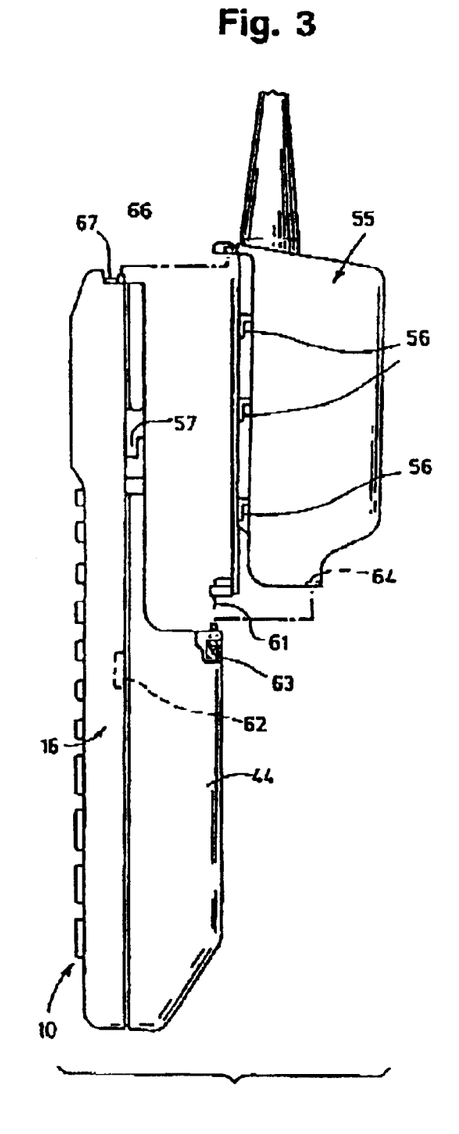
FIG. 3 is a side view of an alternate data terminal in accordance with the invention, a particular provision in accordance with certain features of the invention for engaging and disengaging a data and communications module with respect to a base module being illustrated.

FIG. 3 shows the base module 16 and substantially in a ready position to become mounted to the base module 16 is a data and communications module designated generally by the numeral 55. The data and communications module 55 is shown to represent generally a number of such data and communications modules which may be desirably incorporated into a communications system in accordance with the invention. It may be noted that the data and communications module 55 is shown in FIG. 3 as being of somewhat relatively greater depth or thickness than the data and communications module 48 described with respect to FIG. 2. The change in outer dimensions illustrates that a number of modules of various depth are adapted to match with mounting provisions to attach the respective data and communications module 55 to the base module 16.

The data and communications module 55, as a representative module featuring the attachment to the base module 16 has a plurality of laterally disposed latching hooks or latch hooks 56 which become engaged by respective latching seats or latch seats 57 disposed along the adjacent edge of the base module 16 when the module 55 is moved toward and into engagement with the adjacent edge and then toward the battery compartment 44, as shown by the arrow. Electrical communication is established via a power and communications connector 61 the pins of which engage a mating connector socket 62 within the base module 16. A set of screws 63 may be tightened through the battery compartment 44 into a set of threaded seats 64 disposed in the adjacent wall of the module 55 to securely retain the attached module as an integrated part of the data terminal 10. At the top end of the data terminal 10, a lip or extending stop edge 66 of the module 55 engages a complementarily shaped seat 67 at the top end of the base module 16 to securely interlock the data and communications module 55 with the base module 16.

It is contemplated, for example, for the module 55 to include any of a number of combinations of diverse functional elements. For example, the module 55 may include the aforementioned transceiver, though the antenna 41 may be attached externally as shown in FIG. 2 or might be provided internally, in addition to extended data memory capacity, a modem or a reader of indicia of information may be included, such as a bar code reader, or a shelf tag reader. Shelf tag systems are known in which so-called "shelf tags" contain means for programming information into small display devices which are attached to front edges of merchandise storage shelves. The devices or tags would then retain the programmed data which may be acquired by the reader in the data and communication module 55, for example. Information may be communicated between the shelf tag and the data terminal 10 by various means including radio frequency or optical transmission. Information may be communicated via optical readers in the data and communications terminal 16 as read from liquid crystals, or by other communication such as intra red optical, or low power RF data messages.

Figure 4:
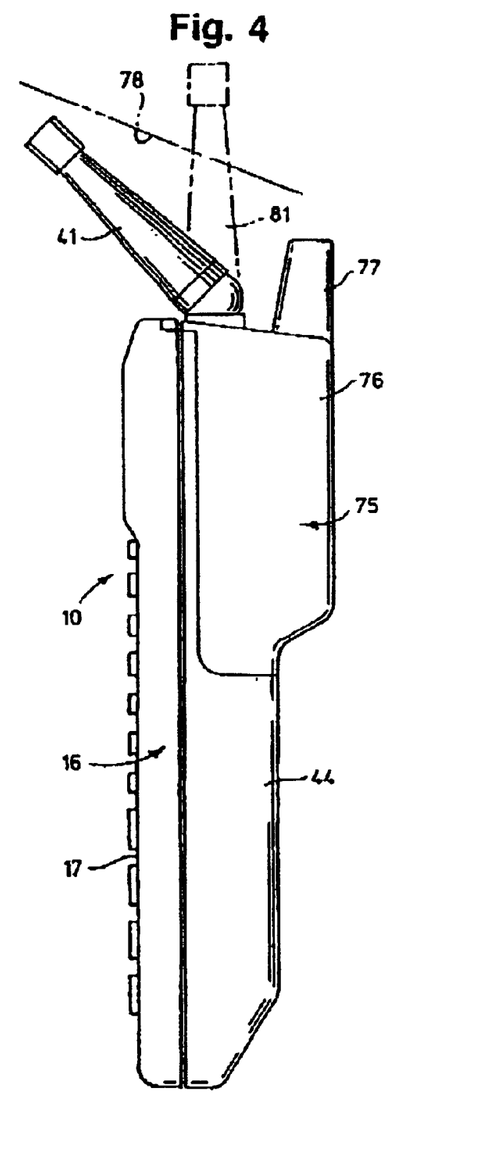
FIG. 4 is a side view of an alternate data terminal in accordance with the invention showing particular features relating to a data and communications module in combination with a base module, such features relating to the data and communications module having an RF communications provision and a data scanning provision and including further a pivotal antenna, all in accordance with the invention.

FIG. 4 shows an alternate embodiment of the data terminal 10 in which the data terminal includes a data and communications module which includes, for example, a radio frequency transceiver module and a CCD scanner module which may be disposed in a lower portion of the module at 76, having a scanning window at 77. Since it may be desirable to position the scanning window near a surface at which data indicia such as bar code labels may be located, as indicated at 78, the antenna which also protrudes from the top end of the data terminal 10 is found to be interfering when disposed in a normally protruding position. It is therefore contemplated to arrange the antenna 41 in a manner in which it may be pivoted from an upwardly protruding position, such as shown in phantom lines at 81 to a tilted position such as shown by the antenna 41.

Figures 5, 6, 7:
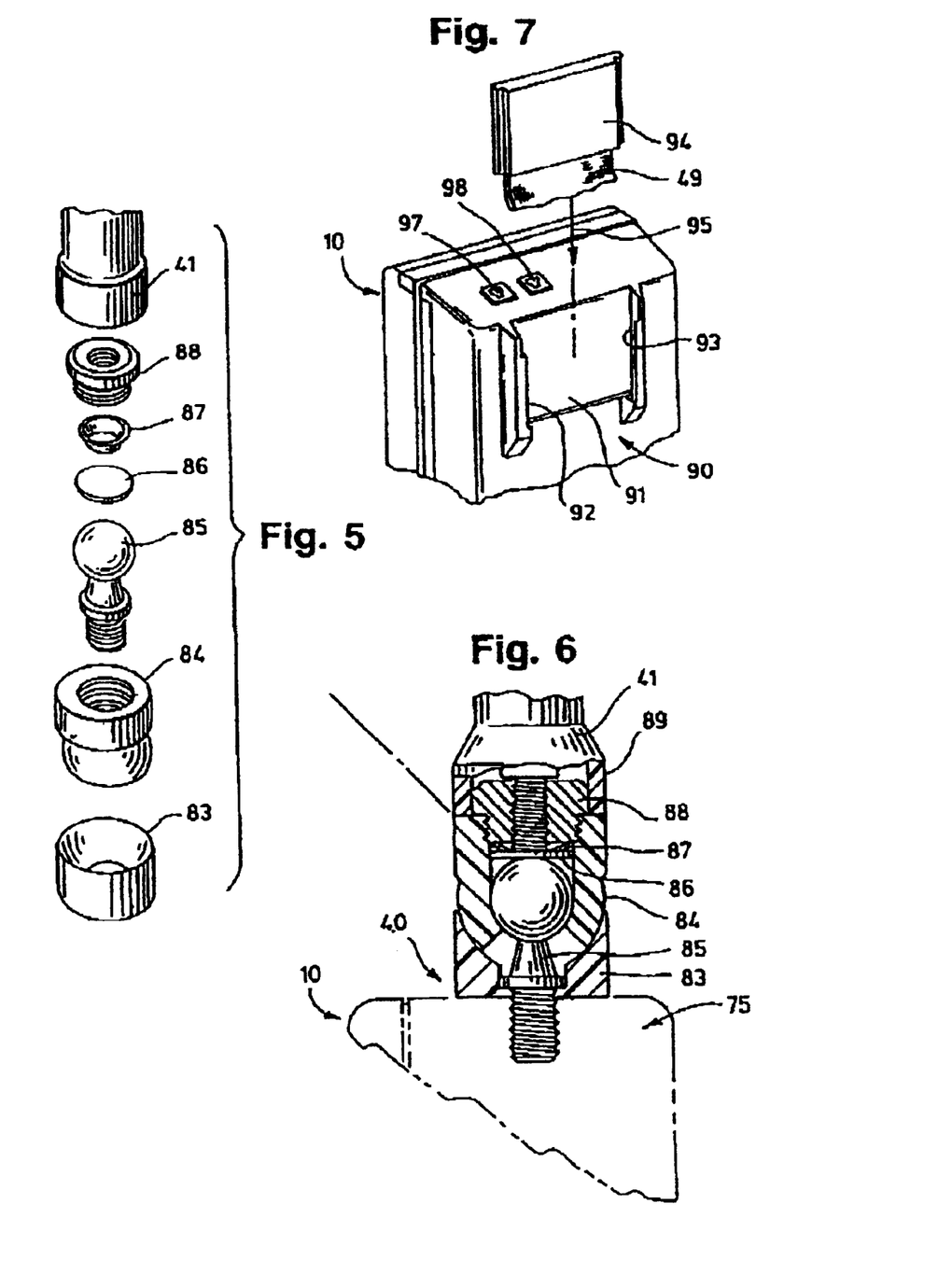
FIG. 5 is an exploded view of a pivot joint of an antenna in accordance with a particular aspect of the present invention.
FIG. 6 is a sectional view of the antenna pivot joint shown in FIG. 5.
FIG. 7 is a partial pictorial view of an upper portion of a data terminal in accordance with the invention, showing in particular a data and communications module having telephone connector plugs for interfacing the data and communications module with telephone communications lines.

In reference to FIGS. 5 and 6, there is shown a pivotal joint which experiences little signal degradation when pivoted from such upwardly extended position to the tilted position in which the scanner window may be brought into proximity of a bar code label, for example, as described. The pivotal antenna joint includes a pivot base or pivot socket 83 into a hollow cup of which fits a pivot ball 84. Both the pivot socket 83 and the pivot ball 84 are of RF dielectric to prevent radio frequency burns of a person touching the antenna when the associated radio transceiver is transmitting. The pivot socket 83 is mounted against an outer wall of the module, such as the module 48, 55 or 75 by an antenna swivel post 35. The swivel post 85 includes a spherical top against which rests a pivot washer 86. The pivot washer is in turn urged into contact with the top of the swivel post by a cupped spring washer 87, also at times referred to as Belville washer. The urging force against the spring washer 87 is provided by a doubly-threaded antenna mounting bushing 88. An external thread of the bushing 88 screws into an upper opening of the pivot ball 84 to complete the pivot joint of the antenna. The antenna 41 screws with its base into the internal threads of the mounting bushing 88. As shown in FIG. 6, a lower dielectric skirt 89 of 11 the antenna 41 extends downward over the outer edge of the bushing, which is of metal, to prevent exposure of the bushing. It should be understood that variations in the pivot joint may be possible within the scope of the invention.

FIG. 7 shows another embodiment and further features of the invention as described herein. The elastic strap 49 may be permanently attached adjacent the bottom end of the data terminal 10 as described herein above. At an upper end, however, the elastic strap may be attached to the exchangeable data and communications modules, such as a module 90 depicted in FIG. 7. In that the modules are exchangeable and in an effort to facilitate a quick replacement of one module for another, the hand strap is attached to the module 90 by a guide structure 91 including left and right hand spaced guide tracks 92 and 93 which receive a guide bracket 94 attached to the upper end of the hand strap 49. To attach the upper end of the hand strap 49 the elastic hand strap is stretched beyond its normal tensioned stretched length and the guide bracket 94 is inserted into an uppermost opening between the guide tracks 92 and 93. The tension of the hand strap 49 pulls the bracket 94 into the space between the guide tracks 92 and 93 in the direction of the arrow 95. The insertion of the bracket 94 securely captures the strap 49 at its upper end. To remove the hand strap at its upper point of attachment, the bracket is simply pulled out of the uppermost opening between the two spaced guide tracks 92 and 93. The embodiment of the data and communications module 90 further shows typical telephone connector jacks 97 and 98 indicating that the module contains a typical modem unit for communication over standard telephone lines. The modem unit as shown by connectors 97, 98 in the module 90 may be supplemented by memory for data storage prior to communication by the modem. In this manner the data terminal may be used in a batch process mode, data being transmitted at times and occasions convenient for telephone hook-up. Modem connections may also take on more significance in that the data terminal may be coupled to a typical cellular telephone unit which in turn can communicate via standard telephone communication networks over vast areas. In the latter mode batch transfer of data may still be desirable, though the need for substantial data storage capacity may be reduced.

Figure 8:
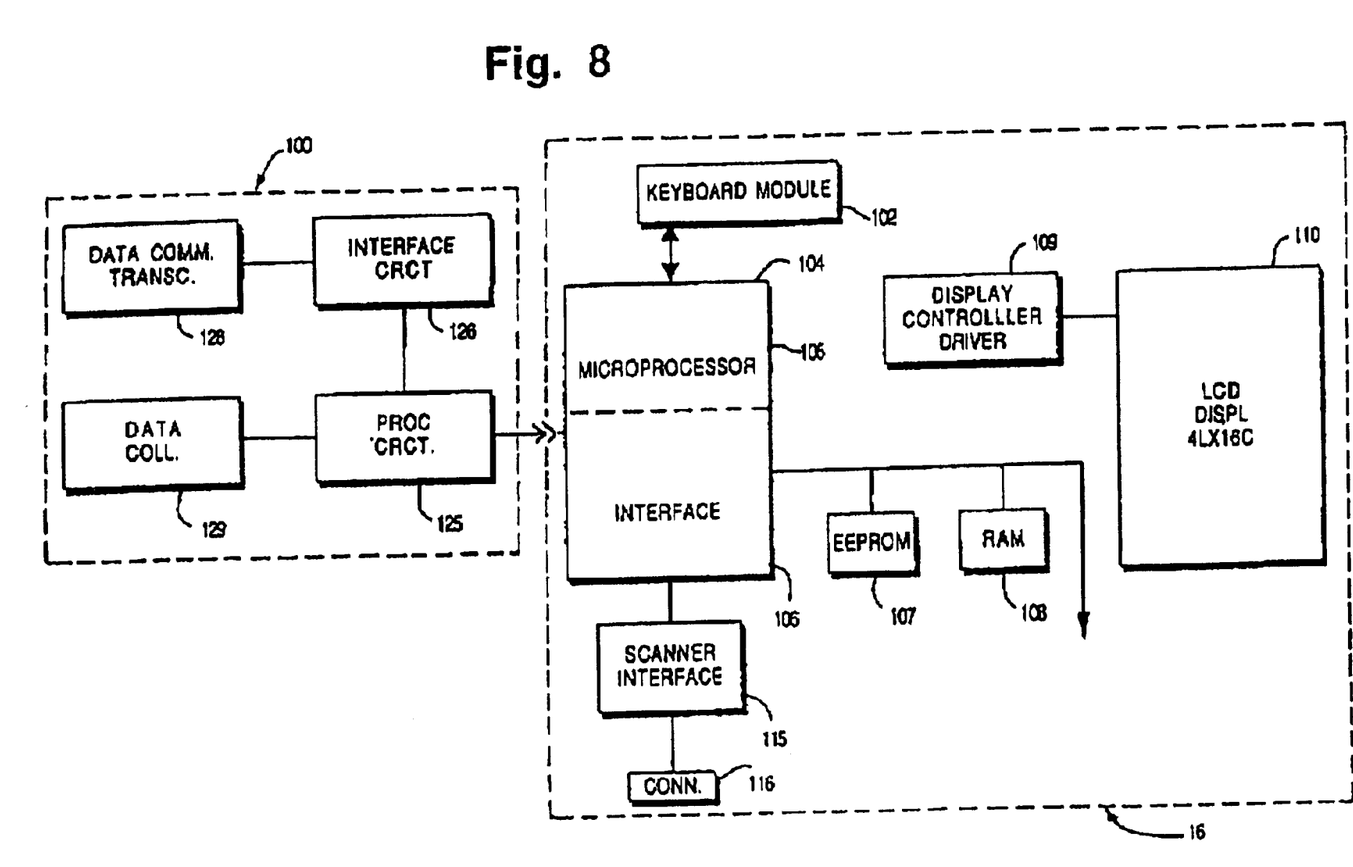
FIG. 8 is a schematic diagram of functional blocks for illustrating contemplated major functional elements of a base module and a respective data and communications module of a data terminal in accordance with the invention.
Figure 9:
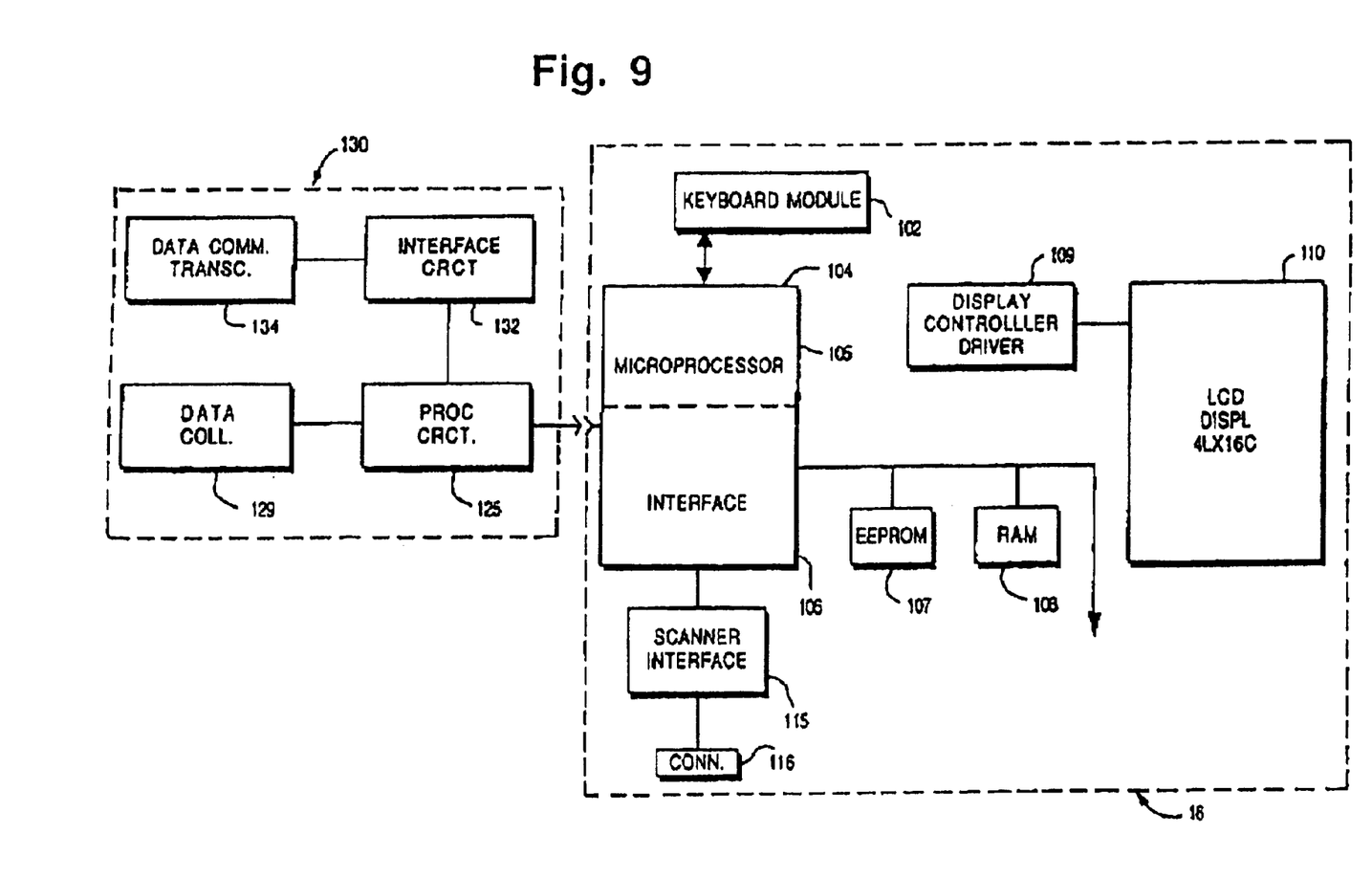
FIG. 9 is a schematic diagram of functional blocks for illustrating the major functional elements shown in FIG. 8 and for illustrating the function of emulating the interface function required by an interface circuit communicating between non-compatible communications functions of the communications or data collection functions of the data and communications module and the base module.

FIGS. 8 and 9 illustrate a microprocessor controlled data transfer between the base module 16 and any of a number of data and communication modules which may include various data collection and data communication transceivers including complex radios such as a spread spectrum radio or such a modem for telephone transmission of data. Though not expressly described, it is understood that the hand-held data terminal 10 as described herein and all of its circuits, including those of attached modules are powered by a battery or power source which occupies the space of the battery compartment 44 as described herein. FIG. 8 shows a block diagram of functions of the base module 16 and a typical data and communications module designated generally by the numeral 100. The base module is operative in conjunction with a typical radio frequency transceiver provided by the data and communication module 100, for example. The base module 16 includes a typical keyboard module 102 interactively coupled to a microprocessor 104. A preferred microprocessor is a 80C196KC device which is a 16-bit microcontroller 105 with on-chip masked ROM, RAM and built-in timers, ports, analog to digital converters and a serial interface 106. Thus, the microprocessor functions as a microcontroller and as an interface for communicating data and control signals to and from the base module 16. In addition to the on-chip memory capacity, an external ROM 107 and an external RAM 108 may be provided for addition data processing and communication capacity. Display controller and driver circuits 109 may be multi-chip circuits or may be integrated into a single device to drive the described LCD screen 110. A typical scanner interface 115 is coupled to a 9-pin connector 116, such as the referred to D subminiature connected which may coupled a laser scanner or CCD scanner to the base module 16 for data collection.

The data and communication module 100 is of particular interest in that an improved interfacing may be may be obtained by coupling communication between the data and communication module 100 and the base module 16 through a microprocessor 125, such as, for example an 80C51microprocessor circuit. Typical on board ROM allows the microprocessor to be programmed to interact with a number of devices in accordance with the stored program. The microprocessor interacts with an interface circuit 126 which may be an analog or mixed analog and digital interface circuit. The program for interacting with the interface circuit 126 may also be stored within a ROM of the interface circuit 126. The interface circuit 126 is coupled to a transceiver module 128. The microprocessor 125 may also be coupled directly to a data collection interface 129 to receive data from a scanner for reading any number of different bar codes or for providing input data from other external sources. The operation of the microprocessor 125 for coupling data to the base module 16 allows various input patterns to be processed by any of specific operational protocols controlled by the microprocessor 125, such that the data input from the data collection circuit can be made the same from any of a number of devices. Also with respect to the operation of the transceiver, in that the program for operating the microprocessor 125 may include particular address codes for data retrieval and data communication via the transceiver, the data sent via data and control bus between the microprocessor 125 and 104 can emulate a uniform data transfer protocol to the base module 16. The simplification resulting from the microprocessor 125 increases the number of communications devices that may be represented by the data communication transceiver circuit or module.

Referring now to FIG. 9, the base module 16 is shown as being coupled to a different data and communications module designated generally by the numeral 130 in which the interface circuit 126 shown in FIG. 8 has been replaced with an interface circuit 132 and the transceiver 134 coupled to the interface circuit 132. The transceiver 134 may for example be a complex radio, such as a spread spectrum radio in lieu of an FM transceiver, such as may have been represented by the block identified at 128 in FIG. 8. However, the program function represented by the interface circuit 132 and interacting with the microprocessor permits the interactive control and data stream between the base module 16 and the data and communication module 130 to be emulated to appear to the base module 16 as being the same as the simple FM transceiver module. The reference to the particular microprocessor circuits should not be considered limiting to the scope of the invention. The combination of two microprocessors interacting with each other, each controlling the environment of a respective one, of two submodules such as the base module and the data and communication module permits an increased number of different components and functions within the data system.

Various changes and modifications in the structure of the described embodiment are possible without departing from the spirit and scope of the invention as set forth in the claims.

What is claimed is:

1. A data communications system comprising:
    a base module, comprising first processing circuitry, first interface circuitry and a first memory that stores base module communications software; and
    a plurality of communications modules interchangeably couplable to the based module, each communications module comprising second interface circuitry and at least one of a plurality of wireless transceivers of differing types;
    wherein the base module receives a selected one of the plurality of communications modules in an engaging position that communicatively couples the first and second interface circuitry and enables the base module to communicate via the selected communications module, characterized in that each communications module further comprises second processing circuitry and a second memory that stores communications module software, and the first processing circuitry, using the base module communications software, supports communication of data via at least one of the plurality of wireless transceivers regardless of which of the plurality of communications modules is selected.

2. A system according to claim 1, wherein the second memory buffers data from the first processing circuitry for subsequent delivery to at least one of the plurality of wireless transceivers.

3. A system according to claim 2, wherein the second memory buffers the data to support batch processing of transmissions.

4. A system according to claim 2, wherein the second memory buffers the data to accommodate storage at a higher rate than immediate transmission permits.

5. A system according to claim 1, wherein the second memory is disposed in the interchangeable communications modules.

6. A system according to claim 1, wherein one of the plurality of wireless transceivers comprises a spread spectrum transceiver.

7. A system according to claim 1, further comprising data collection circuitry.

8. A system according to claim 7, wherein the data collection circuitry comprises code reading circuitry.

9. A system according to claim 7, wherein the data collection circuitry is disposed in one of the plurality of communications modules.

10. A system according to claim 1, wherein the first processing circuitry comprises a first microprocessor.

11. A system according to claim 10, wherein the first microprocessor is selectively operable to perform data processing operations.

12. A system according to claim 1, wherein the second processing circuitry comprises a second microprocessor.

13. A system according to claim 1, wherein data flows through the first and second interface circuitry pursuant to a uniform data transfer protocol.

14. A system according to claim 1, wherein the second interface circuitry communicatively couples with the first interface circuitry upon receipt of the selected one of the plurality of interchangeable communications modules into the base module.

15. A system according to claim 1, wherein the combination of the base module and selected communications module is sized for hand-held operation.

16. A system according to claim 1, wherein the base module further comprises a user interface.

17. A system according to claim 1, wherein the base module comprises a computing device.

18. A system according to claim 1, further comprising an antenna having a pivotal mounting assembly.

19. A data communications device comprising:
   a base unit having a first microprocessor;
   a data and communication module received by the base unit, the data and communication module having a second microprocessor and a transceiver and being selected from a plurality of data and communication modules each having different types of transceivers; and
   a program stored in one of the base unit and the data and communication module for controlling communication of control signals and data between the first microprocessor and the second microprocessor according to a uniform data protocol that is understandable to the base unit.

20. The data communications device of claim 19, wherein the program is further operable to control data communication via the transceiver.

21. A data communications device comprising:
   a base unit comprising:
      a first microcontroller;
      a first data interface; and
      a first memory;
   a data and communication module received by the base unit, comprising:
      a second microcontroller;
      a second data interface communicatively coupled to the first data interface;
      a second memory storing a program for operating the second microcontroller to interact with the second data interface; and
      a transceiver;
   wherein the data and communication module is selected from a plurality of data and communication modules each having substantially different transceivers.

22. The data communications device of claim 21, wherein at least one of the first memory and the second memory store software for operating the first and second microcontrollers to communicate between the first and second data interfaces according to a uniform data transfer protocol, regardless of which of the plurality of data and communication modules is selected.

23. A method of coupling a data and communication module housing a transceiver to a base module in a data communication system, the method comprising:
   selecting the data and communication module from a plurality of data and communication modules each having different transceivers;
   engaging the data and communication module with the base module to establish a communication interface between a first microprocessor of the base module with a second microprocessor of the data and communication module;
   operating the first microprocessor to communicate data on the communication interface according to a first data protocol resident within the base module; and
   operating the second microprocessor to communicate data with the transceiver according to a second protocol specific to the transceiver and to communicate data with the communication interface according to the first data protocol.

24. The method of claim 23, wherein the second microprocessor is operable to convert data and control signals between the first and second protocols.

* * * * *